United States Patent Office 3,557,188
Patented Jan. 19, 1971

3,557,188
4,7-METHANOINDENE DERIVATIVES
Morris Dunkel, Paramus, N.J., assignor to Universal Oil Products Company, Des Plaines, Ill., a corporation of Delaware
No Drawing. Filed Mar. 2, 1967, Ser. No. 619,966
Int. Cl. G07c 69/74
U.S. Cl. 260—468
8 Claims

ABSTRACT OF THE DISCLOSURE

Novel 4,7-methaniondenylidene substituted esters or acids useful as perfume ingredients prepared by dehydrating corresponding hydroxymethanoindenyl esters or acids.

---

This invention relates to a new class of compounds, to the preparational process therefor and to perfume compositions containing such compounds as olfactory ingredients. More particularly, this invention relates to novel 4,7-methanoindent derivatives.

The novel 4,7-methanoindene derivatives of this invention may be represented by the following structural formulae:

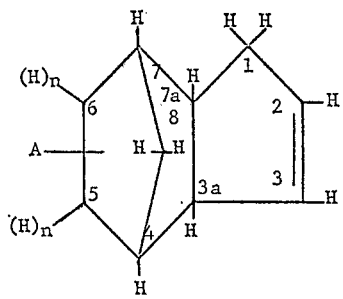

(I)

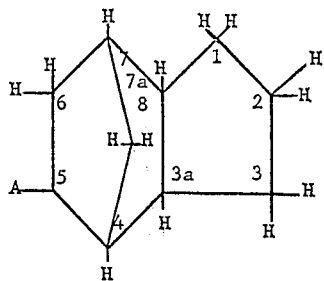

(II)

where A is a bivalent substituent having the structural formula:

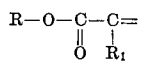

where R and R₁, independently, are selected from the group consisting of hydrogen, alkyl and alkenyl and where $n$ is an integer of 0 or 2; provided, that for the carbon atom in the 5 or 6 position which is substituted with the substituent A, the integer associated therewith is 0 and the other integer is 2. Because of the existence of the double bond in the hexahydromethanoindene of this invention illustrated by structure I above, the positions 5 and 6 are not chemically equivalent, and accordingly, when the hexahydromethanoindene is substituted with the substituent A according to this invention, different isomeric compounds result depending upon whether the substituent is on the 5 or 6 positioned carbon atom. The extremely close physical similarity of such isomeric compounds, moveover, prevents ready identification and separation of the different isomers from each other and for this reason it is intended that both isomeric compounds as well as mixtures thereof be encompassed within this invention by describing the hexahydromethanoindene in this specification and appended claims as hexahydromethanoindene substituted in one of the 5 and 6 positions with the A substituent. No comparable problem exists for the octahydromethanoindene of this invention illustrated by structure II above, inasmuch as there is no double bond in the cyclopentane portion of the molecule and the positions 5 and 6 are accordingly chemically equivalent. For this reason, the octahdromethanoindene is described in this spcification and appended claims as being substituted with the A substituent in the 5 position. Both the hexahydro- and octahydromethanoindenes of this invention also exist in the exo and endo forms and it is inintended that all of these isomeric compounds be encompassed within this invention.

The novel 4,7-methanoindenes of this invention find wide utility in the chemical field and are especially useful as plasticizers, ingredients of synthetic waxes and resins, perfume materials or as intermediates for drugs and insecticides. Of these many used, however, one of the more valuable present uses for these compounds is in perfumery due to their highly pleasant odorous nature. Significant in this respect is that certain of these compounds, and particularly the ester compounds, that is where R of structures I and II above is alkyl or alkenyl, have highly desirable odor properties. For example, ethyl α-methyl, α-(2,3,3a,4,5,6,7,7a-octahydro-4,7-methanoinden - 5 -ylidene) acetate possesses a fine citrusy odor which has wide and valuable application in perfumery.

Accordingly, it is an object of this invention to provide a new class of compounds consisting of 4,7-methanoindenes having a specific bivalent substituent at one of the 5 and 6 positions. Another object is to provide a preparational process for these 4,7-methanoindenes. Still another object of this invention is to provide perfume compositions containing these novel 4,7-methanoindenes as olfactory ingredients. Other objects of this invention will become apparent from the following further detailed description thereof.

The 4,7-methanoindene derivatives of this invention represented by structures I and II above may, in general, be prepared by dehydrating a corresponding alpha hydroxymethanoindenyl ester or acid. This dehydration may be represented by the following equation where an octahydromethanoindene derivative represented by structure II above is prepared:

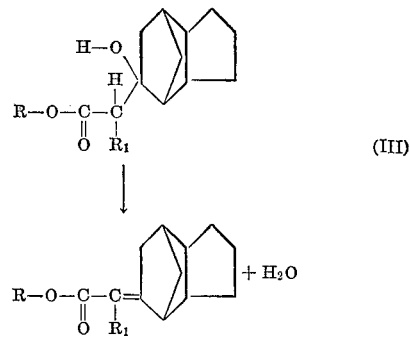

(III)

The preparation of the hexahydromethanoindene derivatives represented by structure I above will proceed according to the same reaction, the only difference being that instead of using an octahydromethanoindene reactant in the dehydration, a hexahydromethanoindene reactant will be used. The alpha hydroxymethanoindenyl ester or acid used in the dehydration is represented by structure III above where R and $R_1$ have the same significance as for structures I and II above and when R or $R_1$ are alkyl or alkenyl, they preferably are alkyl or alkenyl groups containing from 1 to about 5 carbon atoms. The alpha hydroxymethanoindenyl ester or acid represented by structure III above may be obtained by several different preparational methods. One preferred method involves first preparing the ester by adding an alpha halo ester to a corresponding methanoindenone under Reformatsky conditions. The acid may then be obtained from the ester by hydrolysis or saponification technique. Examples of the alpha hydroxymethanoindenyl esters or acids represented by structure III which may be dehydrated to the compounds of this invention include hexahydromethanoindene esters such as methyl α-(5-or 6-hydroxy-3a,4,5,6,7,7a - hexahydro - 4,7 - methanoinden-5 or 6-yl) acetate; methyl α-methyl, α-(5 or 6-hydroxy-3a,4,5,6,7,7a-hexahydro-4,7-methanoinden-5 or 6-yl) acetate; allyl α-(5 or 6 - hydroxy - 3a,4,5,6,7,7a-hexahydro-4,7-methanoinden-5 or 6-yl) acetate; ethyl α-ethyl, α-(5 or 6-hydroxy-3a,4,5,6,7,7a - hexahydro - 4,7 - methanoinden-5 or 6-yl) acetate; propyl α-(5 or 6 - hydroxy - 3a,4,5,6,7,7a-hexahydro-4,7-methanoinden-5 or 6-yl) acetate; or butyl α-(5 or 6-hydroxy-3a,4,5,6,7,7a-hexahydro-4,7-methanoinden-5 or 6-yl) acetate; octahydromethanoindene esters such as methyl α - (5 - hydroxy - 2,3,3a,4,5,6,7,7a-octahydro-4,7-methanoinden-5-yl) acetate; ethyl α-(5-hydroxy-2,3,3a,4,5,6,7,7a-octahydro-4,7-methanoinden-5-yl) acetate; ethyl α-methyl, α - (5-hydroxy-2,3,3a,4,5,6,7,7a-octahydro-4,7-methanoinden-5-yl) acetate; or butyl α-methyl, α-(5-hydroxy - 2,3,3a,4,5,6,7,7a - octahydro-4,7-methanoinden-5-yl) acetate; and hexahydromethanoindene acids such as α-(5 or 6 - hydroxy-3a,4,5,6,7,7a-hexahydro-4,7-methanoinden-5 or 6-yl) acetic acid; or α-allyl, α-(5 or 6-hydroxy-3a,4,5,6,7,7a-hexahydro-4,7-methanoinden-5 or 6-yl) acetic acid and octahydromethanoindene acids such as α-(5-hydroxy - 2,3,3a,4,5,6,7,7a - octahydro-4,7-methanoinden-5-yl) acetic acid; or α-methyl, α-(5-hydroxy-2,3,3a,4,5,6,7,7a-octahydro-4,7-methanoinden-5-yl) acetic acid.

In effecting the dehydration of the hydroxymethanoindenyl esters or acids illustrated above to prepare the compound of the invention, the conditions and procedures used may be widely varied. Generally the dehydration may be conducted according to any of the well known dehydration procedures or techniques such as thermal dehydration or treatment with various dehydrating agents such as phosphorous oxychloride, iodine, thionyl chloride, phosphorous pentoxide or a strong acid such as sulfuric or methane sulfonic. A preferred dehydration procedure, however, involves simply treating the desired hydroxymethanoindenyl ester or acid with a strong acid, for example, methane sulfonic for a period of time sufficient to complete the dehydration. A solvent is conveniently used for the dehydration reaction and inert aromatics such as toluene or benzene are usually satisfactory. The temperature used for the dehydration will vary depending upon the reactant being dehydrated and the particular dehydrating agent employed. Typically, a temperature of from about 50° to 150° C. at atmospheric pressure is satisfactory with reflux temperatures being conveniently used when a solvent is present. The quantity of the dehydrating agent used is not important and when, for example, an acid is used, it may be present in a range of from 0.1 to 5 percent based upon the weight of the reactant. The duration of dehydration is not overly important, and it usually ranges from about 5 to 30 hours. Conveniently, however, the progress of the dehydration may be followed by simply collecting the water formed and when the theoretical amount has been collected, the dehydration reaction may be terminated. When the dehydration is complete, the desired dehydrated product may be recovered from the reaction mixture and purified by conventional methods including extraction, distillation and crystallization. As a modification of the above procedure for preparing various ester compounds, the ester compounds initially prepared in the dehydration may be transesterified to obtain different ester compounds. This is a particularly preferred procedure for preparing alkenyl ester compounds, that is compounds represented by structures I and II above where R is alkenyl. For example, an alkyl ester may be initially prepared in the dehydration and then transesterified to produce an alkenyl ester. The transesterification reaction may be conducted according to conventional transesterification procedures and techniques which involve basically reacting the desired dehydration ester product with the desired alkanol or alkenol in the presence of a suitable transesterification catalyst. Examples of the compounds of this invention represented by structures I and II above include hexahydromethanoindene ester derivatives such as methyl α-(3a,4,5,6,7,7a-hexahydro-4,7-methanoinden-5 or 6-ylidene) acetate; methyl α-methyl, α-(3a,4,5,6,7,7a-hexahydro - 4,7 - methanoinden-5 or 6-ylidene) acetate; ethyl α-(3a,4,5,6,7,7a-hexahydro-4,7-methanoinden-5 or 6-ylidene) acetate; ethyl α-methyl, α-(3a,4,5,6,7,7a-hexahydro-4,7-methanoinden-5 or 6-ylidene) acetate; propyl α - (3a,4,5,6,7,7a - hexahydro - 4,7-methanoinden-5 or 6-ylidene) acetate; or vinyl α-(3a,4,5,6,7,7a-hexahydro-4,7-methanoinden-5 or 6-ylidene) acetate; octahydromethanoindene ester derivatives such as methyl α-(2,3,3a,4,5,6,7,7a-octahydro-4,7-methanoinden-5-ylidene) acetate; ethyl α - methyl, α - (2,3,3a,4,5,6,7,7a-octahydro-4,7-methanoinden-5-ylidene) acetate; butyl α-(2,3,3a,4,5,6,7,7a-octahydro-4,7-methanoinden-5-ylidene) acetate; or butyl α-allyl, α-(2,3,3a,4,5,6,7,7a-octahydro-4,7-methanoinden-5-ylidene) acetate; and hexahydromethanoindene acid derivatives such as α-(3a,4,5,6,7,7a-hexahydro-4,7-methanoinden-5 or 6-ylidene) acetic acid; or α-methyl, α-(3a,4,5,6,7,7a-hexahydro-4,7-methanoinden-5 or 6-ylidene) acetic acid; and octahydromethanoindene acid derivatives such as α - (2,3,3a,4,5,6,7,7a - octahydro-4,7-methanoinden-5-ylidene) acetic acid; or α - ethyl, α - (2,3,3a,4,5,6,7,7a-octahydro-4,7-methanoinden-5-ylidene) acetic acid.

As hereinbefore indicated, the odorous nature of the novel compounds of this invention render them highly valuable as perfume ingredients. This is particularly the case for the ester derivatives, that is, the compounds of structures I and II where R is alkyl or alkenyl. The odor and odor characteristics of the different compounds embraced within this invention differ widely, however. For example, ethyl α - (2,3,3a,4,5,6,7,7a - octahydro - 4,7-methanoinden-5-ylidene) acetate has a proper top note and a costus-type body note; ethyl α-methyl, α-(2,3,3a,4,5,6,7,7a - octahydro-4,7-methanoinden-5-ylidene) acetate has a citrusy odor; and allyl α-(2,3,3a,4,5,6,7,7a-octahydro-4,7-methanoinden-5-ylidene) acetate has a woody-pine, grass-like odor.

The compounds of this invention, either individually or in admixture, may be used in perfumes as the olfactory ingredient thereof and thus create novel perfume compositions. As used herein, the term perfume means a mixture of synthetic or naturally derived organic compounds including for example, alcohols, aldehydes, ethers, ketones, esters, and frequently also hydrocarbons which are combined in fixed proportions so that the odors of the individual compounds combine to produce a harmonious fragrance. In perfumery practice these compounds are combined through the blending of natural oils, gums, resins, animal derivatives, absolutes, natural isolates or synthetic chemicals. The quantity of the novel compounds of this invention utilized in perfumes as the olfactory ingredient thereof may vary within a wide range and depends upon the particular compound used and the particular type of perfume being created or improved. Typically, however, the quantity of the substituted methanoindene used in the preparation of perfumes may range from about 0.01 to 80 percent of the total weight of the perfume with a quantity of about 0.1 to 25 percent by weight being satisfactory in many instances. The perfume compositions of this invention having the substituted 4,7-methanoindenes as olfactory ingredients may be used per se in alcoholic solutions or incorporated into items such as cosmetic creams, soaps, synthetic detergents, talcum powders or other toilet goods such as shampoos to produce products having desirable commercial fragrance properties.

The following examples are given to illustrate the compounds of this invention, the preparational process therefor and perfume compositions containing the compounds as olfactory ingredients. These examples are not, however, intended to limit the generally broad scope of this invention in strict accordance therewith.

EXAMPLE I

Ethyl α-(2,3,3a,4,5,6,7,7a-octahydro-4,7-methanoinden-5-ylidene) acetate was prepared according to the method of this invention by the following procedure:

About 88 grams of ethyl α-(5-hydroxy-2,3,3a,4,5,6,7,7a-octahydro-4,7-methanoinden-5-yl) acetate were charged to a reaction flask equipped with a Dean-Stark trap, condenser and stirrer. About 200 milliliters of toluene and 2 milliliters of methane sulfonic acid were added and with stirring, the mixture was heated to reflux (114° C.) and maintained thereat for about 10 hours during which time about 6.5 grams of water were collected. The reaction mixture was then cooled, washed with a saturated sodium carbonate solution and then with a sodium chloride solution. After the toluene was removed by distillation, the mixture was fractionated to recover 51.5 grams of product boiling at 120° to 127° C. at 2 mm. Hg and having a refractive index $n_D^{25}$ 1.5078 to 1.5072. Analysis of the product by ultraviolet spectroscopy indicated characteristic absorption at 227 mμ.

EXAMPLE II

Ethyl α-methyl, α-(2,3,3a,4,5,6,7,7a - octahydro - 4,7-methanoinden-5-ylidene) acetate and α-methyl, α-(2,3-3a,4,5,6,7,7a-octahydro-4,7-methanoinden-5-ylidene) acetic acid were prepared according to the method of this invention by the following procedure:

Following the procedure of Example I, 270 grams of ethyl α-methyl, α-(5-hydroxy-2,3,3a,4,5,6,7,7a-octahydro-4,7-methanoinden-5-yl) acetate were dehydrated with 17 grams of water being collected. The reaction mixture was cooled, washed with a saturated sodium carbonate solution and then with a sodium chloride solution. The aqueous extracts were recovered and held for further treatment. After removing the solvent by distillation, the washed reaction mixture was fractionated to recover 141 grams of the ester product boiling at 139° C. at 3 mm. Hg and having a refractive index $n_D^{25}$ 1.5082 to 1.5084. Analysis of the ester product by ultraviolet spectroscopy indicated characteristic absorption at 235 mμ.

The recovered aqueous extracts were then treated to recover the acid product by acidifying to precipitate a solid which was extracted with toluene. The extract was washed, dried, concentrated and recrystallized from heptene to recover 4.4 grams of the acid product having a melting point of 155.2° to 156.0° C.

EXAMPLE III

Allyl α-(2,3,3a,4,5,6,7,7a-octahydro - 4,7 - methanoinden-5-ylidene) acetate was prepared according to the following procedure:

About 35 grams of ethyl α-(2,3,3a,4,5,6,7,7a-octahydro - 4,7 - methanoinden-5-ylidene) acetate, 70 grams of allyl alcohol and 0.8 gram of sodium methylate were added to a reaction flask equipment with a reflux head and trap. With stirring, the mixture was heated to reflux and ethyl alcohol was continuously collected in the trap. The heating was continued for about 15 hours at which time the mixture was cooled, and 300 grams of water were added. The resulting mixture was extracted with toluene. The extract was washed, stripped of toluene and fractionally distilled to recover 23 grams of product boiling at 138° to 142° C. at 5 mm. Hg and having a refractive index $n_D^{25}$ of 1.5168 to 1.5070.

EXAMPLE IV

Ethyl α-(3a,4,5,6,7,7a-hexahydro-4,7 - methanoinden-5 or 6-ylidene) acetate is prepared according to the method of this invention by using the procedure of Example I to dehydrate ethyl α-(5 or 6-hydroxy-3a,4,5,6,7,7a-hexhydro-4,7-methanoinden-5 or 6-yl) acetate.

EXAMPLE V

A Lime Blossom-type perfume is prepared using a compound of this invention as an olfactory ingredient by combining the following components in the indicated proportions:

| Component: | Parts by weight |
|---|---|
| Ethyl α-methyl, α - (2,3,3a,4,5,6,7,7a - octahydro-4,7-methanoinden-5-ylidene) acetate | 20 |
| Hydroxy citronellal | 400 |
| Terpineol | 150 |
| Phenylethyl alcohol | 180 |
| Ylang oil, Bourbon | 20 |
| Limes oil, terpeneless | 10 |
| Methyl naphthyl ketone | 50 |
| Iso-Jasmone | 30 |
| Citronellyl acetate | 70 |
| Methyl octine carbonate | 5 |
| Iso-butyl phenylacetate | 10 |
| Aldehyde $C_{12}$ | 5 |
| Jasmin absolute | 20 |
| Broom absolute | 10 |
| Heliotropin | 30 |
| Musk ambrette | 10 |
| | 1020 |

EXAMPLE VI

A Chypre-type perfume is prepared using a compound of this invention as an olfactory ingredient by combining the following components in the indicated proportions:

| Component: | Parts by weight |
|---|---|
| Ethyl α - (2,3,3a,4,5,6,7,7a - octahydro - 4,7-methanoinden-5-ylidene) acetate | 10 |
| Benzyl acetate | 60 |
| Phenyl ethyl alcohol | 120 |
| Bergamot | 200 |
| Ylang | 50 |
| Jasmin compound | 120 |
| Rose compound | 100 |
| Civet absolute | 10 |
| Angelica root | 5 |
| Castoreum absolute | 5 |
| Coumarin | 120 |
| Labdanum resin | 30 |
| Musk ambrette | 20 |
| Oakboss | 10 |
| Patchouli | 20 |
| Santal | 70 |
| Vanillin | 60 |
| | 1010 |

EXAMPLE VII

A Pine Bouquet-type soap perfume is prepared using a compound of this invention as an olfactory ingredient by combining the following components in the indicated proportions:

| Component: | Parts by weight |
|---|---|
| Allyl α - (2,3,3a,4,5,6,7,7a - octahydro - 4,7-methanoinden-5-ylidene) acetate | 10 |
| Bornyl acetate | 200 |
| Geranium, Algerian | 100 |
| Cassia | 40 |
| Clove | 50 |
| Petitgrain | 50 |
| Lavender | 250 |
| Bergamot | 200 |

| Component: | Parts by weight |
|---|---|
| Terebene | 50 |
| Musk xylene | 20 |
| Coumarin | 30 |
| Patchouli | 10 |
| | 1010 |

I claim as my invention:

1. A compound selected from the group consisting of 3a,4,5,6,7,7a-hexahydro-4,7-methanoindene and 2,3,3a,4,5,6,7,7a-octahydro-4,7-methanoindene which is substituted in one of the 5 and 6 positions with a bivalent substituent:

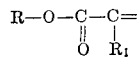

where R and $R_1$ independently, are selected from the group consisting of hydrogen, alkyl of from 1 to about 5 carbon atoms and alkenyl of from 1 to about 5 carbon atoms.

2. The compound according to claim 1 characterized in that it is 3a,4,5,6,7,7a-hexahydro-4,7-methanoindene substituted in one of the 5 and 6 positions.

3. The compound according to claim 1 characterized in that it is 2,3,3a,4,5,6,7,7a-octahydro-4,7-methanoindene substituted in the 5 position.

4. The compound according to claim 1 characterized in that it is ethyl α-methyl, α-(2,3,3a,4,5,6,7,7a-octahydro-4,7-methanoinden-5-ylidene) acetate.

5. The compound according to claim 1 characterized in that it is ethyl α-(2,3,2a,4,5,6,7,7a-octahydro-4,7-methanoinden-5-ylidene) acetate.

6. The compound according to claim 1 characterized in that it is α-methyl, α-(2,3,3a,4,5,6,7,7a-octahydro-4,7-methanoinden-5-ylidene) acetic acid.

7. The compound according to claim 1 characterized in that it is allyl α-(2,3,3a,4,5,6,7,7a-octahydro-4,7-methanoinden-5-ylidene) acetate.

8. The compound according to claim 1 characterized in that it is ethyl α-(3a,4,5,6,7,7a-hexahydro-4,7-methanoinden-5 or 6-ylidene) acetate.

References Cited
UNITED STATES PATENTS

| 2,688,627 | 9/1954 | Cohen et al. | 260—468XB |
| 2,817,673 | 12/1957 | Roelen et al. | 260—468XB |
| 2,847,435 | 8/1958 | Wiese et al. | 260—468XB |

LORRAINE A. WEINBERGER, Primary Examiner

P. J. KILLUS, Assistant Examiner

U.S. Cl. X.R.

252—522; 260—514